United States Patent [19]
Yano

[11] Patent Number: 5,214,427
[45] Date of Patent: May 25, 1993

[54] INPUT APPARATUS
[75] Inventor: Hajime Yano, Kanagawa, Japan
[73] Assignee: Sony Corporation, Tokyo, Japan
[21] Appl. No.: 569,188
[22] Filed: Aug. 17, 1990
[30] Foreign Application Priority Data Aug. 24, 1989 [JP] Japan .................................. 1-219115
Aug. 28, 1989 [JP] Japan .................................. 1-222351
Aug. 28, 1989 [JP] Japan .................................. 1-222352

[51] Int. Cl.⁵ ............................................. G08C 21/00
[52] U.S. Cl. ................................. 341/20; 340/706; 178/18
[58] Field of Search ................. 341/20, 32; 340/707, 340/710, 706; 178/18; 82/3

[56] References Cited
U.S. PATENT DOCUMENTS

| | | | |
|---|---|---|---|
| 3,535,447 | 10/1970 | Wollrich | 178/18 |
| 4,029,899 | 6/1977 | Gordon | 178/19 |
| 4,397,033 | 8/1983 | Bechet | 382/3 |
| 4,672,155 | 6/1987 | Naruse | 178/19 |
| 4,686,331 | 8/1987 | Burgess | 178/19 |
| 4,697,050 | 9/1987 | Farel et al. | 178/18 |
| 4,729,108 | 3/1988 | Uchiyama | 364/520 |

FOREIGN PATENT DOCUMENTS

| | | |
|---|---|---|
| 159191 | 10/1983 | European Pat. Off. . |
| 3709464 | 10/1983 | European Pat. Off. . |
| 259841 | 3/1988 | European Pat. Off. . |
| 326396 | 8/1989 | European Pat. Off. . |

Primary Examiner—Donald J. Yusko
Assistant Examiner—Michael Horabik
Attorney, Agent, or Firm—Lewis H. Eslinger; Jay H. Maioli

[57] ABSTRACT

An input device has an exciting coil for generating a predetermined exciting magnetic field. First and second coils are displaced from each other by a predetermined distance in a predetermined direction and capable of generating an induced electromotive voltage when excited by the exciting coil. Third and fourth coils are displaced from each other by a predetermined distance in the predetermined direction and capable of generating an induced electromotive voltage when excited by the exciting coil. The third and fourth coils are displaced by a predetermined distance from the first and second coils, and all of the coils are similarly constructed.

14 Claims, 8 Drawing Sheets

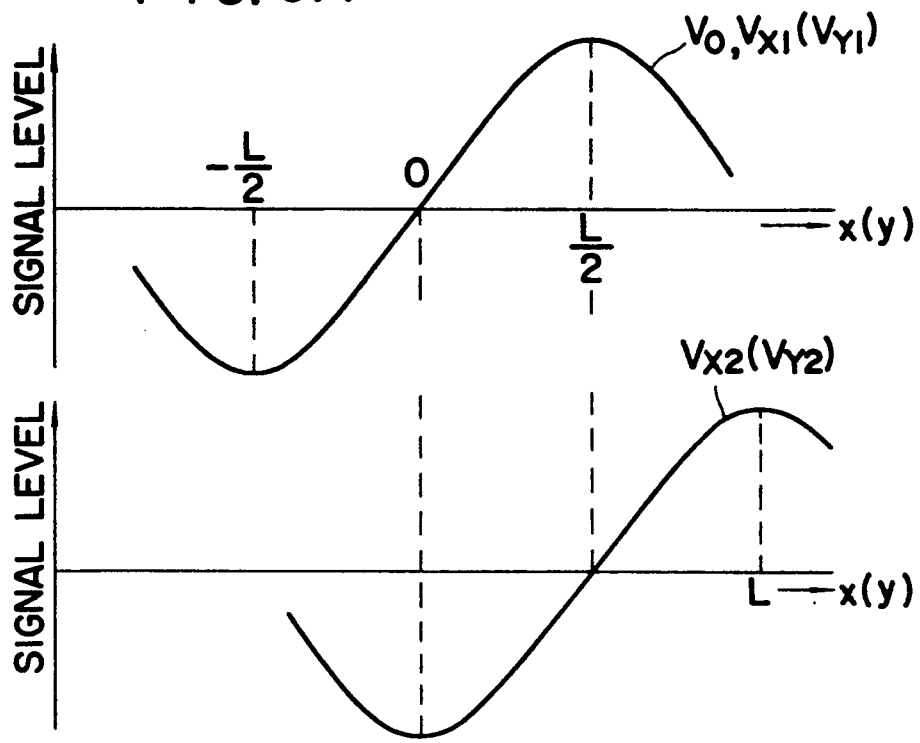
FIG. 3A
FIG. 3B
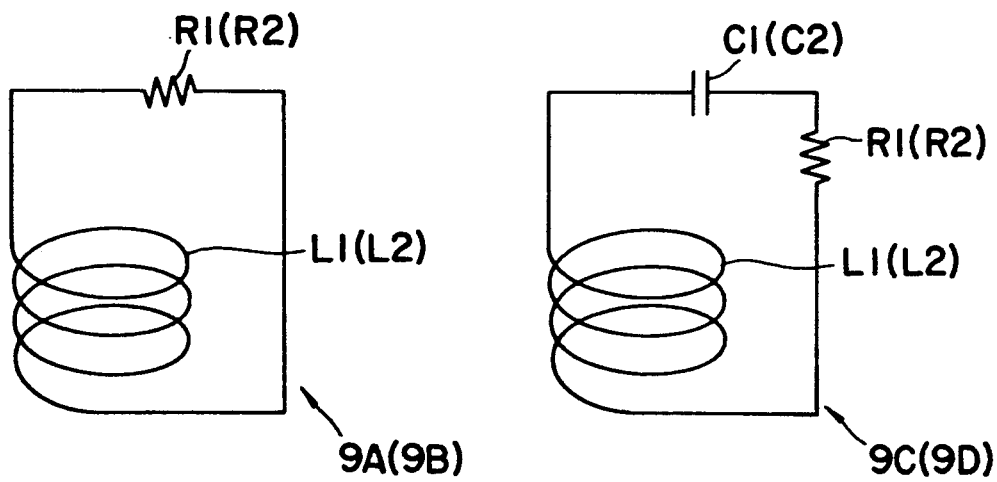
FIG. 4
FIG. 5

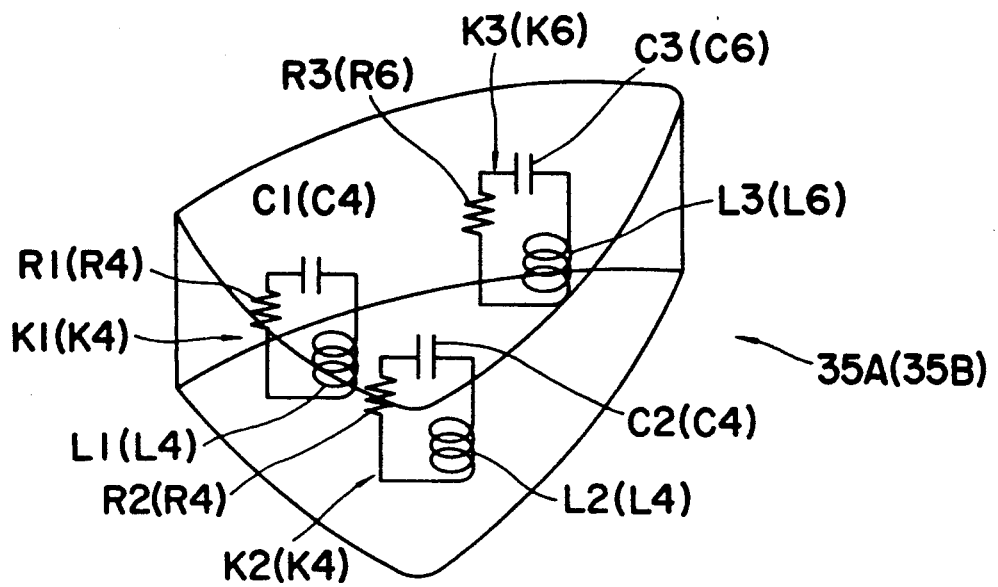
F I G. 8
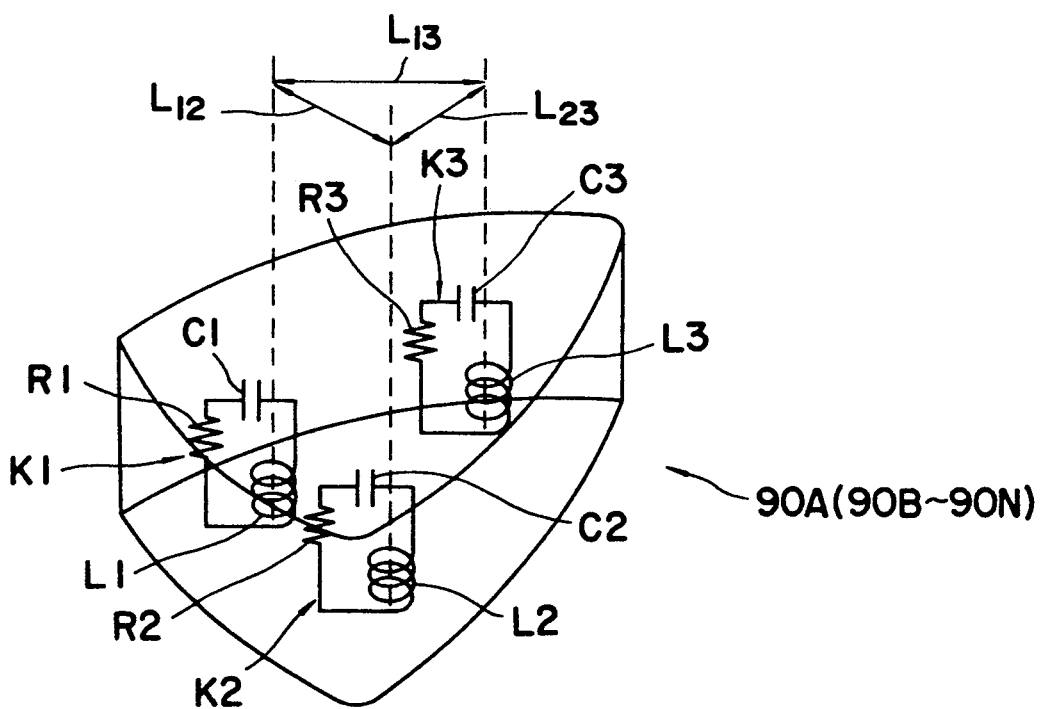
F I G. 9

INPUT APPARATUS

BACKGROUND OF THE INVENTION

1. Field of the Invention

The present invention relates to an input device and, more particularly, to a device that can be employed for supplying handwritten characters or the like to a computer or similar apparatus as inputs.

2. Description of the Prior Art

Hitherto, in the case where handwritten characters are supplied as inputs to a computer or the like, two-dimensional coordinate data input means such as a digitizer, a mouse or the like has been used.

In a two-dimensional coordinate data input means of the type described above, a movable body having an exciting coil is moved on a tablet in which a predetermined detection coil is embedded so that an induced electromotive voltage excited in the detection coil is detected. As a result, the two-dimensional coordinate data for the movable body is detected.

Therefore, handwritten characters or the like can be supplied as inputs by continuously detecting coordinate data while moving the movable body.

Furthermore, a switch provided for the movable body is switched so as to switch the mode for processing coordinate data. As a result, the display of the input characters can be switched.

In a two-dimensional coordinate data input means of the type described above, the movable body must be supplied with an exciting electric current in order to drive the excited coil.

Furthermore, the movable body provided with the switch must be arranged in such a manner that the switching action performed by the switch can be transmitted to the computer.

Therefore, the conventional two-dimensional coordinate data input means is attended by the problem that a wire must be extended from the movable body, and coordinate data must be generated as inputs by dragging the wire.

When the handwritten characters or the like are supplied as inputs by dragging a wire, the handling facility deteriorates; and what is worse, a failure occasioned by the disconnection of the wire or the like cannot always be prevented.

OBJECTS AND SUMMARY OF THE INVENTION

An object of the present invention is to overcome the above-described problems. In particular, an object of the present invention is to provide an input device capable of supplying coordinate input data and employing a wireless movable body.

The foregoing and other objects, features and advantages of the invention are achieved by the provision of an input device comprising: an exciting coil for generating a predetermined exciting magnetic field; first and second coils displaced from each other by a predetermined distance in a predetermined direction and capable of generating an induced electromotive voltage when excited by said exciting coil; and third and fourth coils displaced from each other by a predetermined distance in the predetermined direction and capable of generating an induced electromotive voltage when excited by the exciting coil, the third and fourth coils being displaced by a predetermined distance from the first and second coils.

The nature, principle and utility of the invention will become more apparent from the following detailed description of the preferred embodiments thereof, in conjunction with the accompanying drawings, in which like parts are designated by like reference characters.

BRIEF DESCRIPTION OF THE DRAWING

In the accompanying drawings:

FIG. 3, consisting of FIG. 3A and FIG. 3B, is a signal waveform drawing according to the present invention;

FIGS. 4 and 5 are circuit diagrams illustrating the principle of identifying an object that disturbs the magnetic field;

FIG. 8 is a schematic perspective view illustrating a movable body according to the present invention;

FIGS. 9 and 10 are schematic perspective views illustrating another embodiment of the present invention;

DESCRIPTION OF THE PREFERRED EMBODIMENTS

An embodiment of the present invention will be described with reference to the drawings.

1. Principle of Position Detection

Figure 1:
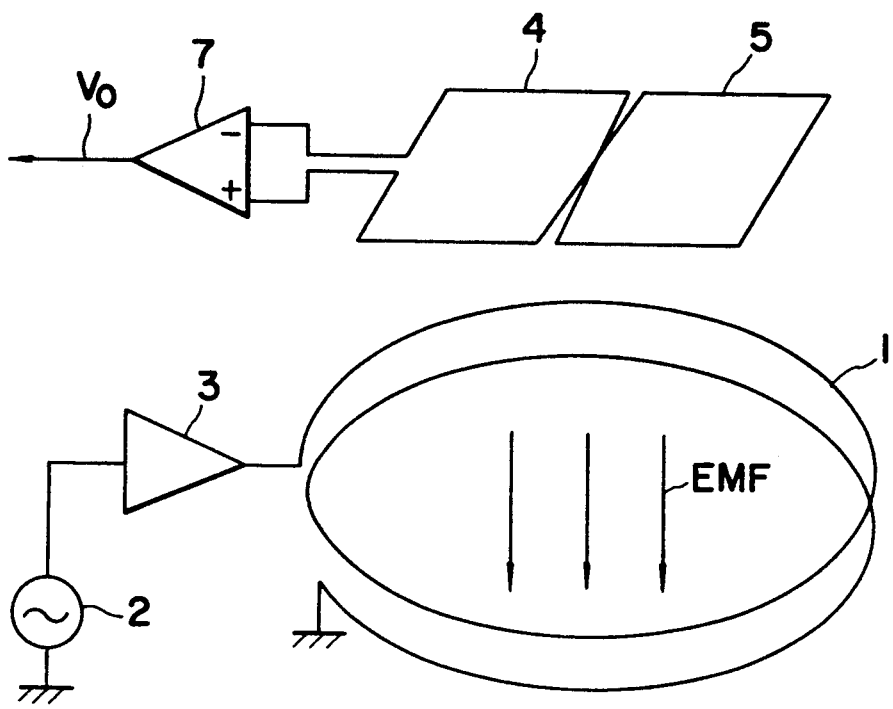
FIGS. 1 and 2 are schematic drawings illustrating the principle of position detection according to the present invention.

As FIG. 1 shows, an exciting magnetic field EMF is formed by connecting an exciting coil 1, arranged so as to generate a uniform magnetic field, to an oscillating circuit 2 and a drive circuit 3. Furthermore, two coils 4 and 5 are positioned in the thus formed exciting magnetic field EMF.

The coils 4 and 5 are both rectangular and have openings the respective areas of which are the same. Furthermore, the coils 4 and 5 are disposed in such a manner that the faces of their openings run parallel to the side of an opening formed in the exciting coil 1.

The coils 4 and 5 are spaced apart from each other by a predetermined distance and arranged in such a manner that a side of each overlaps a side of the other so that a figure eight is formed.

As a result, in the coils 4 and 5, the magnetic flux interlinking with the exciting magnetic field EMF is maintained equally if the exciting magnetic field EMF is not disturbed. Moreover, equal induced electromotive voltages are generated in the coils 4 and 5 response to excitation by the exciting coil 1.

Since the coils 4 and 5 are connected to each other in such a manner that their overlapping sides cross each other, the induced electromotive voltage of the coil 4 and that of the coil 5 cancel each other.

The coil 4 is connected to an amplifier circuit 7 so as to obtain an output voltage $V_0$, and a balanced induced electromotive voltage is obtained if the exciting magnetic field EMF is not disturbed. As a result, the output voltage $V_0$ is maintained at a zero level.

On the other hand, when the exciting magnetic field EMF is disturbed by placing a metal member or the like in the exciting magnetic field EMF, the induced electromotive voltage of the coil 4 and that of the coil 5 are changed to a degree that depends on the degree of the disturbance. As a result, the output voltage $V_0$ corresponding to the above-described change can be detected.

Figure 2:
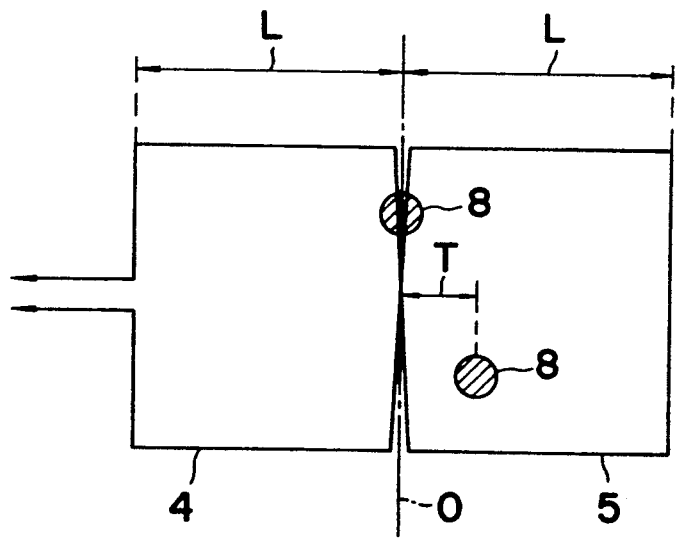

When a circular, axially symmetric metal member 8 is placed anywhere along the side on which the coils 4 and 5 overlap each other (see FIG. 2 near the top center), an eddy current is generated in the metal member 8. (The axis parallel to that side is called the "central axis 0" hereinafter.) As a result, the exciting magnetic field EMF is disturbed symmetrically with respect to the central axis 0.

In this case, in the coils 4 and 5, although the induced electromotive voltage is changed, the balanced state is maintained. Therefore, the output voltage $V_0$ is maintained at zero level even though the exciting magnetic field EMF has been disturbed.

On the other hand, when the metal member 8 is positioned in such a manner that it does not coincide with the central axis 0 (see FIG. 2 near the bottom right), the exciting magnetic field EMF for the coil 4 and that for the coil 5 are disturbed in different degrees.

In this case, the balance of the induced electromotive voltage is disturbed in the coils 4 and 5. The amplitude of the output voltage $V_0$ is changed from the zero level to a degree corresponding to the above-described disturbance of the balance.

Assuming that the distance from the central axis 0 to the metal member 8 in the direction in which the coils 4 and 5 are positioned successively is T, the output voltage $V_0$ (see FIG. 3 (A)) can be approximately expressed by the following equation:

$$V_0 = K_{1A} \sin\left(\pi \cdot \frac{T}{L}\right) \sin \omega t \quad (1)$$

where the symbol L represents the length of one side of each of the coils 4 and 5 in the same direction as the distance T, $\sin \omega t$ represents the drive signal for the exciting coil 1, and $K_{1A}$ represents a proportional constant.

As described above, since the coils 4 and 5 are spaced from each other by a predetermined distance in the exciting magnetic field EMF and are connected in such a manner that the induced electromotive voltages cancel each other, the balance between the induced electromotive voltage of the coil 4 and that of the coil 5 is disturbed in accordance with the position of the metal member 8 that disturbs the exciting magnetic field EMF. The disturbance of the balance of the induced electromotive voltage can be detected via the output voltage $V_0$. As a result, position information T of the metal member 8 that disturbs the exciting magnetic field EMF can be supplied as an input in the form of amplitude information.

Therefore, the wireless input of coordinate data can be performed by employing an object made, for example, of the metal member 8, which disturbs the balance of the coils 4 and 5, as the movable body.

Since the coils 4 and 5 for generating the induced electromotive voltages so as to cancel each other form a figure eight, the coils 4 and 5 can be accurately manufactured with substantially identical shapes. Furthermore, the output voltage $V_0$ can be easily transmitted through a lead wire, effectively avoiding the influence of the exciting magnetic field EMF. As a result, accurate position information can be supplied as an input.

2. Principle of Identification of the Object That Disturbs the Exciting Magnetic Field When coordinate data is supplied as an input by using a plurality of movable bodies serving as coordinate data input means, the handling facility of the input device is improved.

That is, if coordinate data is supplied as an input by simultaneously using a plurality of movable bodies, for example, a plurality of persons can simultaneously generate handwritten characters as inputs.

Furthermore, if data input is effected by alternately using a plurality of movable bodies and the processing mode of the coordinate input data is switched in accordance with the plurality of movable bodies, the display of the handwritten characters supplied as inputs can be correspondingly switched.

In order to achieve this, the movable bodies must be identified when their coordinate data is supplied as inputs.

As FIG. 4 shows, a parallel circuit 9A is formed by establishing a connection between a coil L1 which is excited by the exciting magnetic field EMF and a resistor R1. As a replacement for the metal member 8, the coil L1 is placed on the coils 4 and 5.

As a result, the coil L1 is excited by the exciting magnetic field EMF so that an induced electromotive voltage is generated and an electric current passes through the coil L1 via the resistor R1.

The exciting magnetic field EMF is disturbed by the current passing through the coil L1 so that the coil L1 terminated at the resistor R1 can be used as the object which disturbs the exciting magnetic field EMF.

Therefore, the relationship expressed by Equation (1) can be established by using the coil L1 terminated at the resistor R1 as an alternative to the metal member 8. As a result, position information T of the coil L1 can be detected as amplitude information of the output voltage $V_0$.

In this state, an electric current of a high level can be passed by reducing the resistance of the resistor R1. Therefore, a large value can be obtained as the proportional constant $K_{1A}$ shown in Equation (1).

If the coils L1 and L2 are alternately used in the case where the coil L1 terminated at the resistor R1 and the coil L2 terminated at a resistor R2 are used as the objects disturbing the exciting magnetic field EMF, the coils L1 and L2 can be distinguished by detecting the proportional constant $K_{1A}$ from the relationship shown in Equation (1).

That is, since the proportional constant $K_{1A}$ is changed in accordance with the degree of coupling between the coils 4 and 5 which are changed in accordance with the object positioned in the exciting magnetic field EMF and the exciting coil 1, the degree of coupling can be indirectly detected by detecting the proportional constant $K_{1A}$.

Therefore, the object disturbing the magnetic field EMF can be identified.

The display of coordinate data of the handwritten character supplied as an input is, for example, switched in accordance with the result of the identification of the coils L1 and L2 so that the handling facility of the input device is improved.

As FIG. 5 shows, the coil (to be called "resonance coil" hereinafter) L1 coupled to the exciting magnetic field EMF, the resistor R1 and the capacitor C1 are connected to one another in series so as to be placed in the exciting magnetic field EMF as an alternative to the metal member 8.

Since a series resonance circuit 9C is constituted by the resonance coil L1, the resistor R1 and the capacitor C1, the largest electric current passes through the resonance coil L1 when the exciting coil 1 is operated at resonance frequency f defined by the following equation:

$$f = \frac{1}{2\pi \sqrt{L3 \cdot C3}} \quad (2)$$

If the resistor $R_1$ has a small resistance and the sharpness Q of the resonance circuit 9C is enhanced, the largest electric current can be passed through the resonance coil L1 at the resonance frequency f.

Furthermore, when the frequency of the drive signal is displaced from the resonance frequency f, the level of the electric current to be passed through the resonance coil L1 can be maintained at about zero.

Therefore, in the case where a resonance circuit 9D the resonance frequency of which is different from that of the resonance circuit 9C is constituted by the resonance coil L2, the capacitor C2 and the resistor R2 and the resonance circuits 9C and 9D are simultaneously positioned in the exciting magnetic field EMF, the relationship expressed by Equation (1) can be established in only the resonance coil L1 of the resonance circuit 9C by operating the exciting coil 1 at the resonance frequency of the resonance circuit 9C. On the other hand, when the exciting coil 1 is operated at the resonance frequency of the resonance circuit 9D, the relationship expressed by Equation (1) can be established in only the resonance coil L2 of the resonance circuit 9D.

As a result, when coordinate data is supplied as an input, position information can be conveyed as amplitude information by using the resonance coils L1 and L2 forming the resonance circuits used as the objects that disturb the exciting magnetic field EMF.

Even if the resonance coils L1 and L2 having the different resonance frequencies are simultaneously positioned in the exciting magnetic field EMF, the object disturbing the exciting magnetic field EMF can be identified in accordance with the resonance frequency by successively switching the frequency of the exciting magnetic field EMF.

On the other hand, if the resonance frequency of the series resonance circuit 9C and that of the series resonance circuit 9D, which are connected in series, are selected to be the same frequency, the proportional constant $K_{1A}$ is changed in the parallel circuits 9A and 9B in accordance with the degree of coupling of the exciting coil 1 by setting the level of the resistor R1 and that of R2 to different values.

Therefore, in the case where the resonance coils L1 and L2 are set to the same resonance frequency, the resonance coil can be identified by alternately positioning them in the exciting magnetic field EMF and by detecting the degree of coupling.

3. First Embodiment

3.1 Structure of First Embodiment

In this embodiment, coordinate data is supplied as an input by simultaneously using a plurality of movable bodies on the basis of the principle described above.

Figure 6:
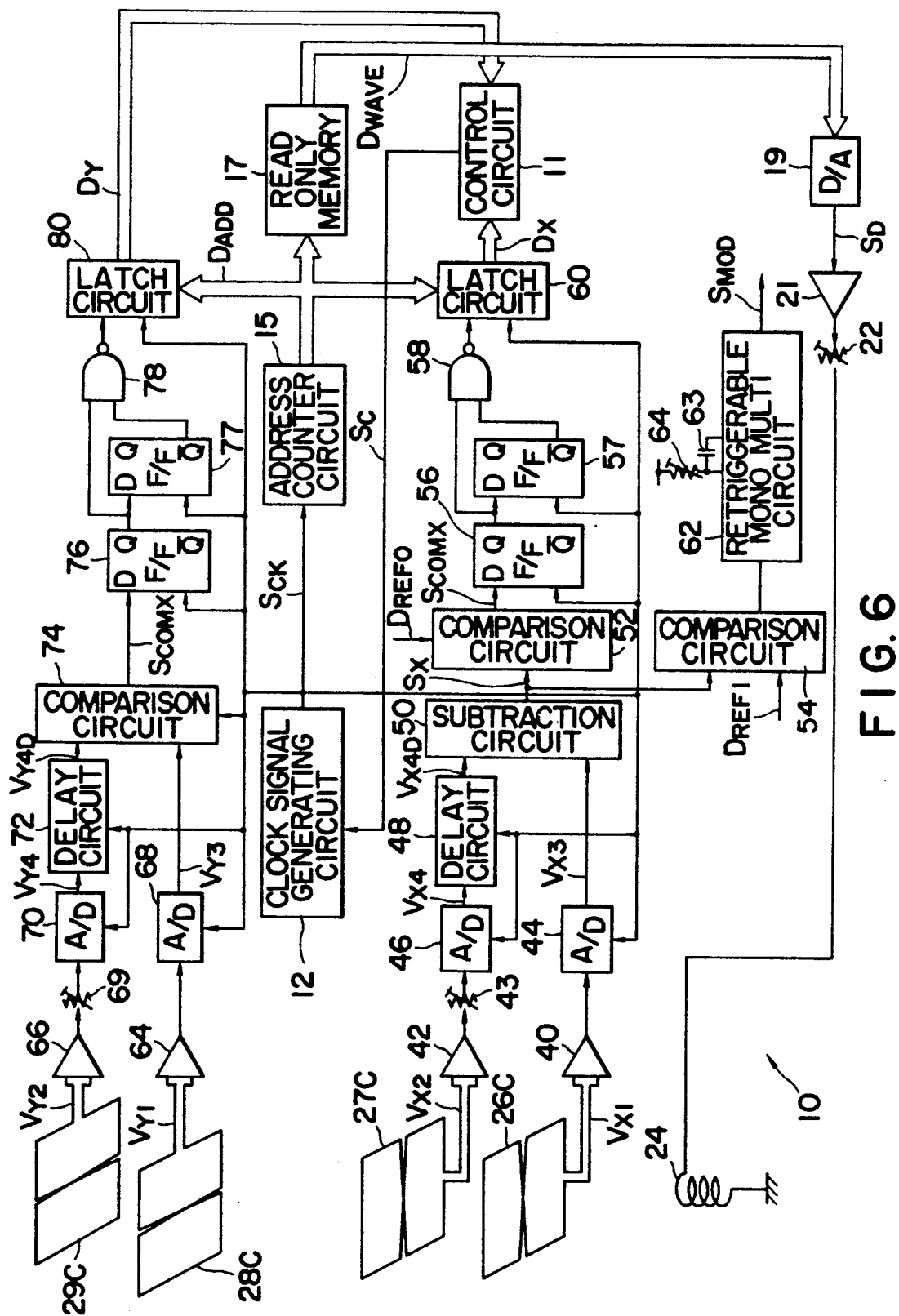
FIG. 6 is a block diagram illustrating an embodiment of a two-dimensional data input device according to the present invention.

That is, as FIG. 6 shows, an overall body 10 of the two-dimensional coordinate data input device generates a clock signal $S_{CK}$ of a predetermined frequency in response to a control signal $S_C$ transmitted from a control circuit 11 in the form of a calculation circuit structure.

A clock signal generating circuit 12 is constituted by a PLL (Phase Locked Loop) oscillating circuit so that the frequency dividing ratio is switched in accordance with the control signal $S_C$. As a result, the clock signal $S_{CK}$ the clock frequency of which is switched at a predetermined rate is generated. The two-dimensional coordinate data input device 10 is operated in response to the clock signal $S_{CK}$.

An address counter circuit 15 successively and circularly counts the clock signal $S_{CK}$ so as to process address data $D_{ADD}$ of a read only memory (ROM) 17.

The read only memory circuit 17 is capable of storing waveform data $D_{WAVE}$ of a sine wave signal for one cycle and successively and circularly transmitting waveform data $D_{WAVE}$ in accordance with address data $D_{ADD}$.

An analog-to-digital conversion circuit 19 converts waveform data $D_{WAVE}$ into an analog signal and applies it to an exciting coil 24 at a predetermined signal level via an amplifier circuit 21 and a signal level compensation circuit 22.

As a result, the exciting coil 24 can be operated by a sine wave signal of a frequency determined by the clock signal $S_{CK}$. Since the clock frequency is switched at predetermined periods, the exciting coil 24 is operated by a sine wave drive signal $S_D$ the frequency of which is successively switched among frequencies $f_1$, $f_2$, $f_3$, $f_4$, $f_5$ and $f_6$.

Figure 7:
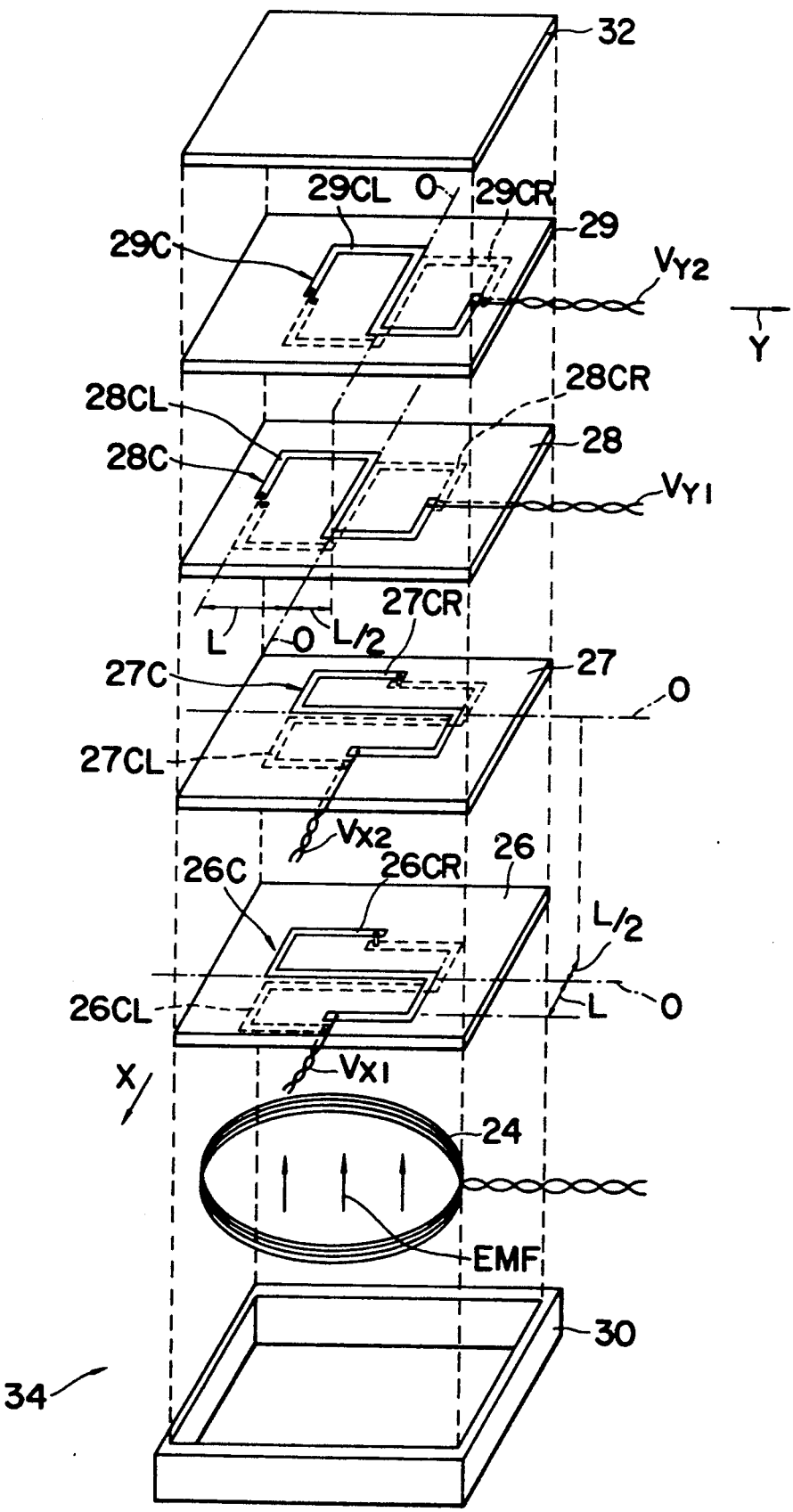
FIG. 7 is a perspective view illustrating its tablet.

As FIG. 7 shows, the exciting coil 24 together with four printed-circuit boards 26, 27, 28 and 29, is accommodated in an accommodating case 30 and a plastic cover 32 so that a table 34 is constituted as a unitary body.

The printed-circuit boards 26, 27, 28 and 29 respectively arranged in such a manner that the circuit patterns formed on both sides thereof are connected to each other through a hole. As a result, the figure eight shaped detection coils 26C, 27C, 28C and 29C, described with reference to FIG. 1, are formed.

That is, the detection coil 26C is arranged in such a manner that first and second coils 26CL and 26CR are connected to each other so as to cancel the induced electromotive voltage.

Furthermore, the detection coils 27C, 28C, 29C are respectively arranged in such a manner that third and fourth coils 27CL and 27CR, fifth and sixth coils 28CL and 28CR and seventh and eighth coils 29CL and 29CR are connected to each other so as to cancel the induced electromotive voltage.

As a result, the detection coils 26C, 27C, 28C and 29C become capable of generating an induced electromotive voltage when excited by the exciting coil 24. Therefore, if no object disturbs the exciting electromagnetic field EMF, the state in which the induced electromotive voltage is balanced in each of the detection coils 26C, 27C, 28C and 29C is maintained. As result, output signals $V_{X1}$, $V_{X2}$, $V_{Y1}$ and $V_{Y2}$ of the detection coils 26C, 27C, 28C and 29C are maintained at zero level.

Furthermore, when accommodated in the accommodating case 30, the printed-circuit boards 26, 27, 28 and 29 are disposed in such a manner the central axis 0 of the detection coils 26C and 27C runs perpendicularly to the direction X and the central Axis 0 of the detection coils 28C and 29C runs perpendicularly to the direction Y.

Therefore, when an object that disturbs the exciting magnetic field EMF is placed on the plastic cover 32, and positioned on the central axis 0 of each of the detection coils 26C, 27C, 28C and 29C, the state in which the induced electromotive voltage is balanced in each of the detection coils 26C, 27C, 28C and 29C is maintained. Thus, the output signals $V_{X1}$, $V_{X2}$, $V_{Y1}$ and $V_{Y2}$ are respectively maintained at zero level.

On the other hand, when the object that disturbs the exciting magnetic field EMF is moved from the central axis 0 in the direction X or Y, the balance of the induced electromotive voltage is disturbed in each of the detection coils 26C, 27C, 28C and 29C. As a result, the amplitudes of the output signals $V_{X1}$, $V_{X2}$, $V_{Y1}$ and $V_{Y2}$ are changed in accordance with the distance of the movement.

Thus, position information of the object that disturbs the exciting magnetic field EMF and the degree of coupling of the exciting coil 24 and the detection coils 26C, 27C, 28C and 29C, which is changed by the object, can be detected as amplitude information of the output signals $V_{X1}$, $V_{X2}$, $V_{Y1}$ and $V_{Y2}$.

The detection coils 26C and 27C are disposed at positions displaced by a distance L/2 in the direction X. Symbol L represents the length of a side which forms the figure eight shape. On the other hand, the detection coils 28C and 29C are disposed at positions displaced by the distance L/2 in the direction Y.

Consider the case where an object that disturbs the exciting magnetic field EMF is placed on the plastic cover 32 and assume that the distance from the central axis 0 of each of the detection coils 26C and 28C to the object that disturbs the exciting magnetic field EMF in the directions X and Y are X and Y respectively. In that case, the output signals $V_{X1}$ and $V_{Y1}$ of the detection coils 26C and 28C can be expressed by the following equations corresponding to Equation (1):

$$V_{X1} = K_{11} \cdot \sin\left(\pi \cdot \frac{x}{L}\right) \sin \omega t \quad (3)$$

$$V_{Y1} = K_{21} \cdot \sin\left(\pi \cdot \frac{y}{L}\right) \sin \omega t \quad (4)$$

On the other hand, the output signals $V_{X2}$ and $V_{Y2}$ of the detection coils 27C and 29C can be expressed by the following equations:

$$V_{X2} = K_{12} \cdot \sin\left(\pi \cdot \frac{x - \frac{L}{2}}{L}\right) \sin \omega t \quad (5)$$
$$= K_{12} \cdot \cos\left(\pi \cdot \frac{x}{L}\right) \sin \omega t$$

$$V_{Y2} = K_{22} \cdot \sin\left(\pi \cdot \frac{y - \frac{L}{2}}{L}\right) \sin \omega t \quad (6)$$
$$= K_{22} \cdot \cos\left(\pi \cdot \frac{y}{L}\right) \sin \omega t$$

As a result of the structure arranged in such a manner that the detection coils 26C and 27C and the detection coils 28C and 29C are displaced by the distance L/2, when the object that disturbs the exciting magnetic field EMF is displaced from the central axis 0 of the detection coils 26C and 28C in directions X and Y, two pairs of output signals $V_{X1}$ and $V_{X2}$ and $V_{Y1}$ and $V_{Y2}$ (see FIGS. 3(A) and (B)) the changes of the amplitudes of which are displaced by 90° C. in accordance with the displacements X and Y can be obtained.

As FIG. 8 shows, the movable body 35 comprises three resonance circuits K1, K2 and K3 formed by using the resonance coils L1, L2, L3, the capacitors C1, C2, C3 and the resistors R1, R2 and R3, the three resonance circuits K1, K2 and K3 having a large degree of sharpness. As a result, when the movable body 35 is placed on the plastic cover 32, the resonance coils L1, L2 and L3 can be excited by the exciting magnetic field EMF.

The movable body 35B has the same shape as that of the movable body 35A and is arranged in such a manner that resonance circuits K4, K5 and K6 are disposed at the same positions in the movable body 35A as an alternative to the resonance circuits K1, K2 and K3.

In the resonance circuits K1, K2, K3, K4, K5 and K6, the values of the resonance coils L1 to L6 and capacitors C1 to C6 are selected as that the circuits K1 to K6 resonate at respective frequencies $f_1$, $f_2$, $f_3$, $f_4$, $f_5$ and $f_6$. As a result, when the exciting coil 24 is driven by a drive signal $S_D$ of frequency $f_1$, $f_2$, $f_3$, $f_4$, $f_5$ or $f_6$, an electric current is passed through only the resonating coil L1, L2, L3, L4, L5 or L6 of the resonance circuit K1, K2, K3, K4, K5 or K6; substantially no electric current passes through the resonance circuits K1 to K6 having different resonance frequencies.

As a result, as for the two pairs of the output signals $V_{X1}$ and $V_{X2}$ and $V_{Y1}$ and $V_{Y2}$, the exciting magnetic field EMF is disturbed by the resonance coil L1 disposed in the movable body 35A when the exciting coil 24 is being driven by the drive signal $S_D$ having the frequency $f_1$. Therefore, the relationships expressed by Equations (3) to (6) are established in the resonance coil L1. When the frequency of the drive signal $S_D$ is switched to the frequency $f_2$, the object that disturbs the electromagnetic field EMF is switched to the resonance coil L2. Therefore, the relationships expressed in Equations (3) to (6) are established in the resonance coil L2.

When the frequency of the drive signal $S_D$ is switched to the frequency $f_3$, the object that disturbs the exciting magnetic field EMF is switched to the resonance coil L3, causing the relationships expressed by Equations (3) to (6) to be established in the resonance coil L3. Furthermore, the relationships expressed by Equations (3) to (6) are established in the resonance coils L4, L5 and L6 at the respective frequencies $f_4$, $f_5$ and $f_6$.

As a result, as for the output signals $V_{X1}$, $V_{X2}$, $V_{Y1}$ and $V_{Y2}$, position information of the resonance coils L1 to L6 can be detected as amplitude information by switching the frequency of the drive signal $S_D$.

In this embodiment, in order to transmit the output signals $V_{X1}$ and $V_{X2}$, $V_{Y1}$ and $V_{Y2}$ from the detection coils 26C, 27C, 28C and 29C, a land for connecting a surface of each of the printed-circuit boards 26 to 29 to the lead wire is provided and twisted-pair lines are connected to the land. As a result, the influence of the exciting magnetic field EMF of the output signals $V_{X1}$, $V_{X2}$, $V_{Y1}$ and $V_{Y2}$ upon the lead wire is prevented. As a result, accurate coordinate data can be supplied as an input.

The two-dimensional coordinate data input device 10 is arranged in such a manner that the output signals $V_{X1}$ and $V_{X2}$ supplied to amplifier circuits 40 and 42 are amplified and are converted into digital signals by analog-to-digital (A/D) conversion circuits 44 and 46. The level of the output signal $V_{X2}$ is compensated via a level compensation circuit 43 in such a manner that the proportional constants $K_{11}$ and $K_{12}$ of the output signals $V_{X1}$ and $V_{X2}$ assume the same value.

As a result, output signals $V_{X3}$ and $V_{X4}$ expressed by the following equations can be obtained via the analog-to-digital conversion circuits 44 and 46 by putting $K_{11}=K_{12}=K$ in Equations (3) and (5):

$$V_{X3} = K \cdot \sin\left(\pi \cdot \frac{x}{L}\right)\sin \omega t \tag{7}$$

$$V_{X4} = K \cdot \cos\left(\pi \cdot \frac{x}{L}\right)\sin \omega t \tag{8}$$

The delay circuit 48 is constituted by connecting a predetermined number of shift register circuits in series, the shift register circuits using a clock signal $S_{CK}$ as a reference. As a result, the output signal $V_{X4}$ expressed by a sine function is delayed and converted into the output signal $V_{X4D}$ expressed by the following cosine function $$V_{X4D} = -K \cdot \cos\left(\pi \cdot \frac{x}{L}\right)\cos \omega t \tag{9}$$

As the delay circuit is constituted by connecting a predetermined number of the shift register circuits in series, the delay time can be switched in accordance with the clock cycle In this embodiment, the clock frequency is switched so as to switch the frequency of the drive signal $S_D$. As a result, the delay time of the delay circuit can be switched in accordance with the frequencies $f_1$ to $f_6$ of the drive signal $S_D$. Even if the frequency of the drive signal $S_D$ has been switched, the output signal $V_{X4}$ can be accurately converted into the output signal $V_{X4D}$.

A subtraction circuit 50 subtracts the output signal $V_{X4D}$ from the output signal $V_{X3}$. As a result, position information of the resonance coils L1 to L6 obtained as amplitude information can be converted into phase information as expressed by the following equation:

$$\begin{aligned} S_X &= K \cdot \sin\left(\pi \cdot \frac{x}{L}\right)\sin \omega t + \\ & \quad K \cdot \cos\left(\pi \cdot \frac{x}{L}\right)\cos \omega t \\ &= K \cdot \cos\left(\omega t - \pi \cdot \frac{x}{L}\right) \end{aligned} \tag{10}$$

That is, in the case where position information of the resonance coils L1 to L6 is directly detected from amplitude information, accurate detection of position information cannot be performed, except as to the resonance coils L1 and L6, if the amplitude of the output signals $V_{X1}$ and $V_{X2}$ from the detection coils 26C and 27C is changed by a given factor.

Moreover, the amplitude of each of the output signals $V_{X1}$ and $V_{X2}$ is also changed in accordance with the degree of coupling of the detection coils 26C, 27C and the exciting coil 24. For example, in the case where a resonance coil having the resonance frequency $f_1$ and connected to a resistor having a small resistance level and another resonance coil having the resonance frequency $f_1$ and connected to a resistor having a large resistance level are alternately used, output signals $V_{X1}$ and $V_{X2}$ having different amplitudes will be obtained even though the resonance coils are at the same position. Therefore, accurate position information cannot be obtained in this case.

However, in this embodiment, position information of the resonance coils L1 to L6 obtained as amplitude information is converted into phase information. The thus obtained phase information changes only as a function of position information. As a result, even if the degree of coupling of the detection coils 26C, 27C and the exciting coil 24 has been changed, accurate position information can be detected.

That is, the subtraction signal $S_X$ transmitted from the subtraction circuit 50 includes position information of the resonance coils L1 to L6 as phase information. Therefore, if the structure is arranged in such a manner that the result of a comparison between the phase of the drive signal $S_D$ of the exciting coil 24 and that of the subtraction signal $S_X$ can be obtained, position information of the resonance coils L1 to L6 can be detected.

Thus, as a result of the structure in which the detection coils 26C and 27C are displaced from each other by a predetermined distance L/2, the two output signals $V_{X1}$ and $V_{X2}$, including position information with respect to the detection coils 26C and 27C as amplitude information, can be obtained. Therefore, only position information of the resonance coils L1 to L6 can be selectively extracted in accordance with the two output signals $V_{X1}$ and $V_{X2}$.

Since the amplitude of the subtraction signal $S_X$ is changed depending only upon the degree of coupling of the detection coils 27C, 28C and the exciting coil 24, a resonance coil connected to resistors having the same resonance frequency and different resistance levels can be identified (that is, the apparatus discriminates between a resonance coil having the above-described resonance frequency $f_1$ and connected to a resistor having a small resistance level and a resonance coil having the resonance frequency $f_1$ and connected to a resistor having a large resistance level).

In the two-dimensional coordinate data input device 10, the subtraction signal $S_X$ is transmitted to comparison circuits 52 and 54 so that position information in the direction X is detected and the type of the resonance coils L1 to L6 is identified.

The comparison circuit 52 receives reference data $D_{REF0}$ representing the signal level of zero so that the signal level of the subtraction signal $S_X$ rises from the zero level, giving rise to its comparison output signal $S_{COMX}$.

Flip-flop (F/F) circuits 56 and 57 are arranged to constitute an edge detection circuit together with an AND circuit 58 so that a latch circuit 60 is operated in one clock period of the clock signal $S_{CK}$ when the comparison output signal $S_{COMX}$ has been produced.

The latch circuit 60 is arranged to receive address data $D_{ADD}$ to be transmitted from the address counter 15 so that the address data $D_{ADD}$, the value of which is successively and circularly changed in response to the drive signal $S_D$ of the exciting coil 24, is latched when the subtraction signal $S_X$ rises from the zero level.

As a result, with the latch circuit 60, a latch value that is changed in accordance with the change in the phase of the subtraction signal $S_X$ with respect to the drive signal $S_D$ for the exciting coil 24 can be obtained, and a comparison between the phase of the drive signal $S_D$ and that of the subtraction signal $S_X$ can easily be made.

According to this embodiment, the thus latched address data is applied as an input to a control circuit 11 as coordinate data $D_X$ in the direction X.

With the assistance of the control circuit 11, the resonance coils L1 to L6 can be identified in accordance with the clock frequency at the time of the latching operation. Therefore, coordinate data $D_X$ in the direction X for each of the resonance coils L1 to L6 can be supplied as an input.

The comparison circuit 54 receives predetermined comparison reference data $D_{REF1}$ together with the subtraction signal $S_X$ so that the signal level of a comparison output signal is raised when the signal level of the subtraction signal $S_X$ is raised above the signal level determined by the comparison reference data $D_{REF1}$.

A retriggerable monostable multivibrator circuit 62 receives the comparison output signal from the comparison circuit 54 and is operated with a time constant determined by a capacitor 63 and a half-fixed resistor 64. As a result, the signal level of an output signal $S_{MOD}$ is switched when the amplitude of the subtraction signal $S_X$ has exceeded a predetermined value.

In the case where a resonance coil is used in which resistors having the same resonance frequencies $f_1$ to $f_6$ but different resistance values are connected to one another as an alternative to the resonance coils L1 to L6, the signal level of the output signal $S_{MOD}$ can be switched by detecting the change in the amplitude of the subtraction signal $S_X$ in accordance with the change in the degree of coupling of the detection coils 26C, 27C and the exciting coil 24.

Therefore, the movable bodies 35A and 35B in which the resonance coils L1 to L6 are provided can be simultaneously used. Furthermore, a plurality of movable bodies in each of which the resonance coils having the same resonance frequencies $f_1$ to $f_6$ are provided can be selectively used so as to provide input coordinate data. The handling facility of the two-dimensional coordinate data input device 10 can be improved by switching, for example, the color, the thickness or the like of a handwritten input line drawing in accordance with the type of the movable body.

Amplifier circuits 64 and 66 amplify the output signals $V_{Y1}$ and $V_{Y2}$ of the detection coils 28C and 29C, and convert them into digital signals by analog-to-digital conversion circuits 68 and 70. The signal level of the output signal $V_{Y2}$ is compensated via a level compensation circuit 69.

As a result, output signals $V_{Y3}$ and $V_{Y4}$ expressed by the following equations can be obtained via the analog-to-digital conversion circuits 68 and 70 similarly to the output signals $V_{X1}$ and $V_{X2}$:

$$V_{Y3} = K \cdot \sin\left(\pi \cdot \frac{y}{L}\right) \sin \omega t \tag{11}$$

$$V_{Y4} = K \cdot \cos\left(\pi \cdot \frac{y}{L}\right) \sin \omega t \tag{12}$$

A delay circuit 72 is constituted in the same manner as the delay circuit 48. As a result, the output signal $V_{Y4}$ which can be expressed by a sine function is delayed so as to be converted into an output signal $V_{Y4D}$ expressed by a cosine function as shown in the following equation:

$$V_{Y4D} = -K \cdot \cos\left(\pi \cdot \frac{y}{L}\right) \cos \omega t \tag{13}$$

A comparison circuit 74 raises the signal level of a comparison output signal $S_{COMY}$ when the signal level of the output signal $V_{Y3}$ becomes higher than the signal level of the output signal $V_{Y4D}$.

In this embodiment, X-directional coordinate data $D_X$ can be obtained by processing the subtraction signal $S_X$ and by detecting when the subtraction signal $S_X$ rises from the zero level.

In practice, the subtraction signal $S_X$ is processed by subtracting the output signal $V_{X4D}$ from the output signal $V_{X3}$. Therefore, the time when the subtraction signal $S_X$ rises from the zero level can be detected without performing a process in which the time when the signal level of the output signal $V_{X3}$ rises above the signal level of the output signal $V_{X4D}$ is detected. Therefore, coordinate data can be detected by a simple structure.

Thus, Y-directional coordinate data can be detected by detecting the time when output signal $V_{Y3}$ rises above the signal level of the output signal $V_{Y4D}$ in the comparison circuit 74. As a result, a coordinate data input device 10 having a simple structure can be obtained.

Flip-flop circuits 76 and 77 constitute an edge detection circuit together with an AND circuit 78 so as to receive the comparison output signal $S_{COMY}$ transmitted from the comparison circuit 74 and operate a latch circuit 80 in one period of the clock signal $S_{CK}$ when the comparison output signal $S_{COMY}$ has been produced.

As a result, the address data $D_{ADD}$ is latched so that Y-directional coordinate data $D_Y$ is detected.

Therefore, with the control circuit 11, the resonance coils L1 to L6 can be identified in accordance with the clock frequency at the time of the latching operation. As a result, Y-directional coordinate input data $D_Y$ of each of the resonance coils L1 to L6 can be provided.

The control circuit 11 receives coordinate data of the resonance coils L3 and L6 as coordinate data of the movable bodies 35A and 35B from coordinate data $D_X$ and $D_Y$ of the resonance coils L1 to L6.

Furthermore, the control circuit 11 performs the following calculation:

$$A = (x3 - x1, y3 - y1) \qquad (14)$$

As a result, a vector passing from the resonance coil L1 toward L3 and one passing from the resonance coil L4 toward L6 are detected so as to constitute inputs representing the direction of the movable body 35A and 35B, where $(x_1, y_1)$ represents the coordinate of the detected resonance coil L1 and $(x_3, y_3)$ represents the coordinate of the resonance coil L3.

In the control circuit 11, the positional relationship of the resonance coils L1 to L6 is detected in accordance with the thus detected coordinate data $D_X$ and $D_Y$. As a result, coordinate data of the movable bodies 35A and 35B can be detected together with the directions of the movement.

Thus, position information of the movable bodies 35A and 35B, in which the resonance coils L1 to L6, which disturb the exciting magnetic field EMF, are disposed, can be detected in accordance with the output signals $V_{X1}$, $V_{X2}$, $V_{Y1}$ and $V_{Y2}$ of the detection coils 26C, 27C, 28C and 29C which are displaced from each other and in which a pair of coils are connected in such a manner that the induced electromotive voltages cancel each other. As a result, two-dimensional coordinate input data can be provided by using the wireless movable bodies 35A and 35B including the resonance circuits K1 to K6 that can disturb the exciting magnetic field EMF.

Therefore, the handling facility and reliability can be improved with respect to the conventional structure.

In this embodiment, the address counter circuit 15, the read only memory 17, the digital-to-analog conversion circuit 19, the amplifier circuit 21, and the level compensation circuit 22 constitute the drive signal generating circuit for transmitting the drive signal $S_D$ to the exciting coil 24. On the other hand, the control circuit 11 and the clock signal generating circuit 12 constitute the drive signal switch circuit for switching the frequency of the drive signal $S_D$.

3.2 Operation of First Embodiment

When an object that disturbs the exciting magnetic field EMF is placed on the plastic cover 32 and positioned on the center axis 0 of each of the detection coils 26C, 27C, 28C and 29C, a state in which the induced electromotive voltage is equilibrated is maintained in each of the detection coils 26C, 27C, 28C and 29C. As a result, the output signals $V_{X1}$, $V_{X2}$, $V_{Y1}$ and $V_{Y2}$ are maintained at the zero level.

On the other hand, when the object that disturbs the exciting magnetic field EMF is moved from the central axis 0 of each of the detection coils 26C, 27C, 28C and 29C in the direction X or Y, the balance of induced electromotive voltage of each of the detection coils 26C, 27C, 28C and 29C is disturbed, causing the signal level of the output signals $V_{X1}$, $V_{X2}$, $V_{Y1}$ and $V_{Y2}$ to be changed in accordance with the movement distance x and y. As a result, position information relating to the object can be detected as amplitude information of the output signals $V_{X1}$, $V_{X2}$, $V_{Y1}$ and $V_{Y2}$.

In the object that disturbs the exciting magnetic field, the clock frequency is switched at a predetermined rate by using the movable bodies 35A and 35B having the resonance circuit of the resonance frequencies $f_1$ to $f_6$. As a result, the frequency of the drive signal $S_D$ is switched. Therefore, position information of each of the resonance coils L1 to L6 provided for the movable bodies 35A and 35B can be detected as amplitude information of the output signals $V_{X1}$, $V_{X2}$, $V_{Y1}$ and $V_{Y2}$ when the drive signal $S_D$ is maintained at the resonance frequency of each of the resonance circuits.

The output signals $V_{X1}$, $V_{X2}$, $V_{Y1}$ and $V_{Y2}$ are respectively supplied to the analog-to-digital conversion circuits 44, 46, 68 and 70 via the amplifier circuits 40, 42, 64 and 66 so as to be converted into digital output signals $V_{X3}$, $V_{X4}$, $V_{Y3}$ and $V_{Y4}$. The signal level of each of the output signals $V_{X4}$ and $V_{Y4}$ is compensated by the level compensation circuits 48 and 69. the output signals $V_{X4}$ and $V_{Y4}$ expressed by the since function are converted by the delay circuits 48 and 72 into the output signals $V_{X4D}$ and $V_{Y4D}$ expressed by the cosine function.

The output signals $V_{X3}$ and $V_{X4D}$ are subtracted in the subtraction circuit 50. As a result, position information of the resonance coils L1 to L6 obtained as amplitude information is converted into phase information.

The subtraction signal $S_X$ transmitted from the subtraction circuit 50 is compared in the comparison circuit 52 with reference data $D_{REFO}$ representing the zero signal level so as to obtain a result. The comparison output signal $S_{COMX}$ is transmitted to the latch circuit 60 via the edge detection circuit constituted by the flip-flop circuit 56, 57 and the AND circuit 58. As a result, the address data $D_{ADD}$ is latched as the timing of the rise of the subtraction signal $S_X$ from the zero level. The result of the comparison made between the phase of the drive signal $S_D$ and that of the subtraction signal $S_X$ is latched by the latch circuit 60. As a result, the resonance coils L1 to L6 can be identified in accordance with the clock frequency so that X-directional coordinate input data $D_X$ can be provided.

The subtraction signal $S_X$ is subjected to a comparison with predetermined comparison reference data $D_{REF1}$ in the comparison circuit 54 so as to obtain a result. The comparison output signal is transmitted via the retriggerable monostable multivibrator circuit 62.

Where a movable body having resonance coils having the same resonance frequencies $f_1$ to $f_6$ and connected to a resistor having a large resistance level is employed as an alternative to a movable body having the resonance coils L1 to L6, the change in the amplitude of the subtraction signal $S_X$ in accordance with the change in the degree of coupling of the detection coils 26C, 27C and the exciting coil 24 is detected so that the signal level of the output signal $S_{MOD}$ can be switched.

The output signals $V_{Y3}$ and $V_{Y4D}$ are supplied to the comparison circuit 74 in which the time at which the level of the output signal $V_{Y3}$ rises above the level of the output signal $V_{Y4D}$ is detected.

The comparison output signal $S_{COMY}$ transmitted from the comparison circuit 74 is transmitted to the latch circuit 80 via the edge detection circuit constituted by the flip-flop circuit 76, 77 and the AND circuit 78. As a result, the address data $D_{ADD}$ is latched at the time at which the level of the output signal $V_{Y3}$ rises above the level of the output signal $V_{Y4D}$.

Even if the process in which the subtraction signal for the output signals $V_{Y3}$ and $V_{Y4D}$ is formed is omitted, data representing the result of the comparison made between the phase of the subtraction signal and that of the drive signal $S_D$ can be latched by the latch circuit 80. Therefore, Y-directional coordinate data $D_Y$ can be obtained.

As for X- and Y-directional coordinate data $D_X$ and $D_Y$ of each of the resonance coils L1 to L6, coordinate input data $D_X$ and $D_Y$ of the resonance coils L3 to L6 are supplied as coordinate data of the movable bodies 35A and 35B, while the vector passing from the resonance coil L1 toward L3 and the vector passing from the resonance coil L4 toward L6 are supplied as inputs representing the respective directions of movement of the movable bodies 35A and 35B. As a result, position information of the movable bodies 35A and 35B is supplied as inputs in accordance with detected coordinate data of each of the resonance coils.

3.3 Effect of First Embodiment

In the structure described above, the detection coils 26C, 27C, 28C and 29C, in which two coils are connected to each other in the form of a figure eight for the purpose of canceling the induced electromotive voltages of each other, are at predetermined positions so as to be excited by the exciting coil 24 after the frequency has been switched. Furthermore, the resonance coils L1 to L6 that resonate at the driving frequency of the exciting coil 24 are allotted to the movable bodies 35A and 35B. Therefore, coordinate data of the resonance coils L1 to L6 can be detected, and position information consisting of coordinate data and direction of the movable bodies 35A and 35B can be detected.

4. Second Embodiment

In this embodiment, movable bodies 90A to 90N shown in FIG. 9 are used as an alternative to the movable bodies 35A and 35B to generate coordinate input data.

The movable bodies 90A to 90N comprise three resonance circuits K1, K2 and K3 that respectively resonate at frequencies $f_1$, $f_2$ and $f_3$. Furthermore, the distance $L_{12}$ from the resonance circuit K1 to the resonance circuit K2, the distance $L_{23}$ from the resonance circuit K2 to the resonance circuit K3, and the distance $L_{31}$ from the resonance circuit K3 to the resonance circuit K1 are set to different values for each of the movable bodies 90A to 90N.

The frequency of the drive signal $S_D$ is successively switched to the frequencies $f_1$, $f_2$ and $f_3$.

As a result, when the movable bodies 90A to 90N are alternately placed on the tablet 34, coordinate data $D_X$ and $D_Y$ of the resonance coils L1, L2 and L3 of the resonance circuits K1, K2 and K3 can be detected in the control circuit 11.

In this embodiment, the control circuit 11 identifies the movable bodies 90A to 90N placed on the tablet 34 in accordance with detected coordinate data $D_X$ and $D_Y$ of the resonance circuits K1, K2 and K3 and detects both coordinate data and the direction of movement of the movable bodies 90A to 90N. As a result, coordinate input data can be provided by alternately using the movable bodies 90A to 90N.

That is, assuming that detected coordinate data $D_X$ and $D_Y$ of the resonance coils L1, L2 and L3 are $(x_1, y_1)$, $(x_2, y_2)$ and $(x_3, y_3)$, the distances $L_{12}$, $L_{23}$ and $L_{31}$ can be obtained from the following equations:

$$L_{12} = [(x1^2 - x2^2) + (y1^2 - y2^2)]^{\frac{1}{2}} \tag{15}$$

$$L_{23} = [(x2^2 - x3^2) + (y2^2 - y3^2)]^{\frac{1}{2}} \tag{16}$$

$$L_{31} = [(x3^2 - x1^2) + (y3^2 - y1^2)]^{\frac{1}{2}} \tag{17}$$

Therefore, the movable bodies 90A to 90N placed on the tablet 34 can be identified in accordance with the distances $L_{12}$, $L_{23}$ and $L_{31}$ of the movable bodies 90A to 90N previously stored in the memory circuit.

If the same resonance circuits K1, K2 and K3 are positioned in the above-described plurality of movable bodies 90A to 90N so as to identify the movable bodies 90A to 90N placed on the tablet 34 in accordance with the distances $L_{12}$, $L_{23}$ and $L_{31}$ between the resonance coils, the identification of the movable bodies becomes difficult, the movable bodies being arranged in such a manner that the distances $L_{12}$, $L_{23}$ and $L_{31}$ between the resonance coils are the same and the resonance circuits K1, K2 and K3 are positioned symmetrically. Therefore, the control circuit 11 performs the following calculation to detect whether or not value F is a positive value or a negative value for the purpose of performing the identification:

$$F = (x3 - x2)\, y1 + (x1 - x3)\, y2 + (x2 - x1)\, y3 \tag{18}$$

The control circuit 11 performs the following calculation from coordinates $(x_1, y_1)$, $(x_2, y_2)$ and $(x_3, y_3)$ of the resonance coils L1, L2 and L3:

$$(x_A, y_A) = \left( \frac{x_1 + x_2 + x_3}{3}, \frac{y_1 + y_2 + y_3}{3} \right) \tag{19}$$

As a result, the coordinate $(x_A, y_A)$ of the center of gravity is obtained as coordinate data of each of the movable bodies 90A to 90N. Then, the vector passing from the center of gravity toward the resonance coil L1 is supplied as an input representing the direction of each of the movable bodies 90A to 90N.

Thus, the movable bodies 90A to 90N can be identified in accordance with the distances $L_{12}$, $L_{23}$ and $L_{31}$ defined by the positional relationship among the resonance coils. Therefore, coordinate data and the direction of movement of each of the movable bodies 90A to 90N can be detected. As a result, coordinate input data can be provided by alternately using the movable bodies 90A to 90N.

In the structure described above, even if a plurality of movable bodies 90A to 90N are used in which the resonance coils L1 to L3 having the same resonance frequency are disposed at different distances $L_{12}$, $L_{23}$ and $L_{31}$, the movable bodies 90A to 90N can be identified in accordance with the distances $L_{12}$, $L_{23}$ and $L_{31}$ defined by the positional relationship among the resonance coils L1 to L3. Therefore, coordinate data and the direction of movement of each of the movable bodies 90A to 90N can be detected. As a result, coordinate input data can be provided by alternately using the movable bodies 90A to 90N.

5. Third Embodiment

Figure 10:
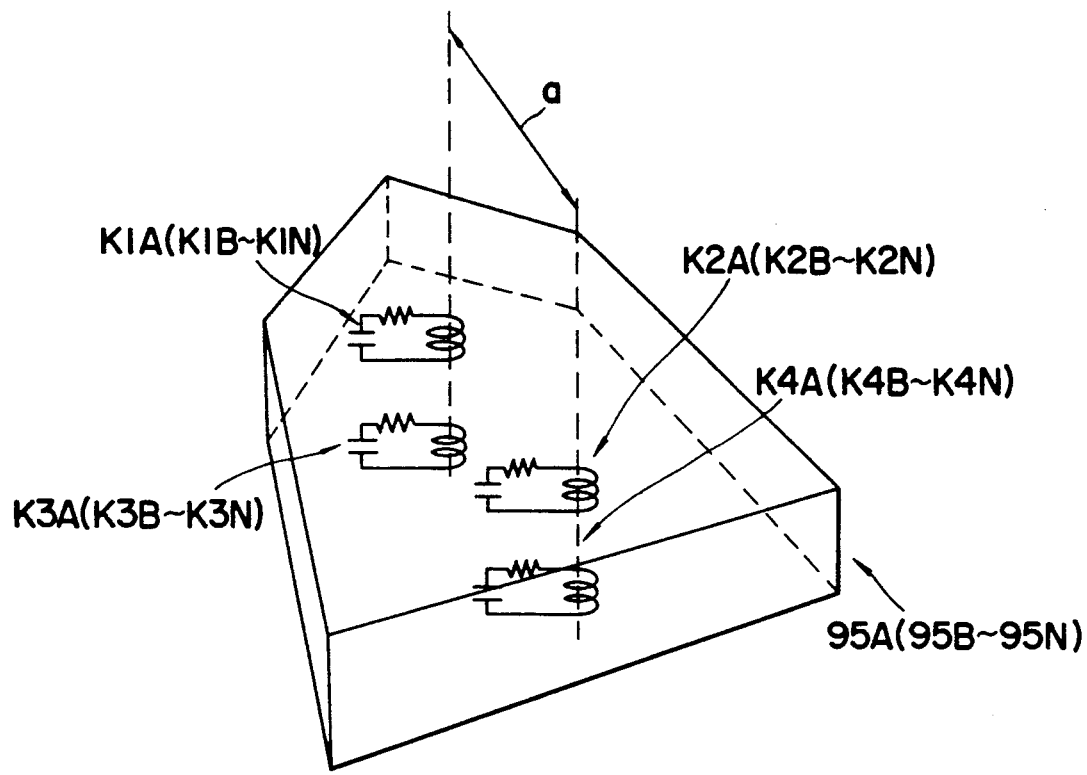

As FIG. 10 shows, in this embodiment a resonance circuit is provided for each of pieces 95A to 95N of shogi (Japanese chess) and coordinate input data of each of the pieces 95A to 95N is provided on the tablet 34 which is in the form of a shogi board.

That is, the pieces 95A to 95N are respectively provided with resonance circuits K1A to K1N, K2A to K2N, K3A to K3N and K4A to K4N in such a manner that their resonance frequencies do not overlap one another. Therefore, even if the pieces 95A to 95N are simultaneously placed on the tablet 34, they can be identified.

In the control circuit 11, when the frequency of the drive signal $S_D$ is switched, coordinate data of the resonance coils allotted to the pieces 95A to 95N such as the kings, rooks, the first pawn, ..., the ninth pawn for both sides are successively detected.

Furthermore, the pieces 95A to 95N are associated, on both sides thereof, with the resonance coils of each of the resonance circuits K1A to K1N, K2A to K2N, K3A to K3N and K4A to K4N. As a result, the side of each of the pieces 95A to 95N can be identified so that whether or not the pieces 95A to 95N have been moved is detected.

Furthermore, the pieces 95A to 95N are constructed in such a manner that the resonance coils of the resonance circuits K1A to K1N, K2A to K2N, K3A to K3n and K4A to K4N are arranged in a predetermined direction as designated by an arrow a when the pieces 95A to 95N are properly positioned on the tablet 34. As a result, the orientation of each of the pieces 95A to 95N can be detected.

In the structure described above, the resonance circuits K1A to K1N, K2A to K2N, K3A to K3N and K4A to K4N the resonance frequencies of which do not overlap one another are allotted to the moving bodies, that is, the pieces 95A to 95N of the game of shogi. Furthermore, their resonance coils are arranged along the direction of the arrow a. Therefore, the coordinates, direction, and side of the pieces 95A to 95N can be represented by input data.

6. Other Embodiments

In the embodiments described above, the detection coil is formed on the printed-circuit board by using the printed circuit pattern and the through hole. The present invention is not, however, limited to such a construction. For example, the detection coil may be formed by winding a wire around a bobbin or the like.

In the embodiments described above, the detection coil is manufactured so as to cancel the induced electromotive voltages by connecting the rectangular coils so as to form a figure eight. The present invention is not, however, limited to such a construction. Another structure may be employed in which a lead wire is connected to each of the coils and the connection is established in such a manner that the induced electromotive voltages of the coils cancel each other in the coils proper or in a portion adjacent to the signal processing circuit.

In this case, a structure may be employed in which the induced electromotive voltages are amplified and then are added so as to cancel each other. Furthermore, any asymmetry of each of the coils and any nonuniformity of the exciting magnetic field EMF may be simultaneously compensated.

In the embodiments described above, the detection coil is manufactured by connecting the rectangular coils so as to form the figure eight for the purpose of positioning the two coils away from each other in such a manner that a side of each of the coils overlaps a side of the other. The present invention is not limited to such a construction. The displacement between the two coils may be freely determined in accordance with the necessary accuracy in detecting coordinate data.

In the embodiment described above, the detection coil is manufactured by connecting one-turn coils of rectangular shape. The present invention is not limited to such a construction. A variety of coils of various shapes and various numbers of windings may be employed.

Figure 11:
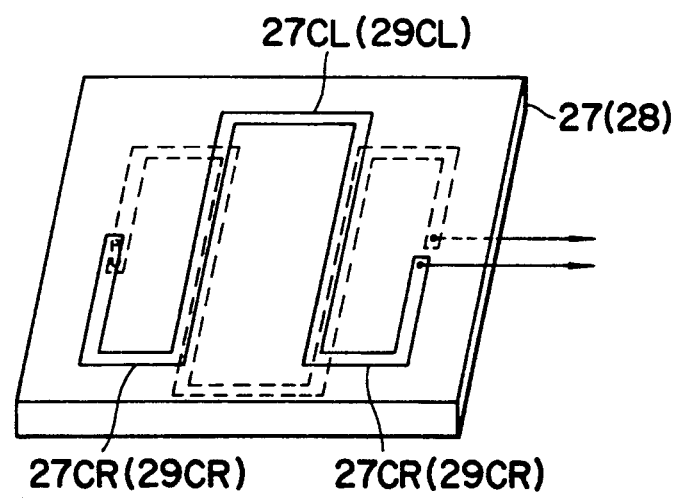
FIGS. 11 and 12 are schematic perspective views illustrating another embodiment of the detection coil.

In this case, detection coils 27C and 29C shifted by the distance L/2 with respect to the positions of the detection coils 26C and 28C may, for example, be constituted as shown in FIG. 11.

That is, the coil 27CL (29CL) is formed at a position displaced by the distance L/2 and the coil 27CR (29CR) is divided so as to be positioned on both sides of the coil 27CL (29CL).

In the structure in which the thus formed detection coil is employed, an effect similar to that obtained in the first embodiment can be obtained.

Figure 12:
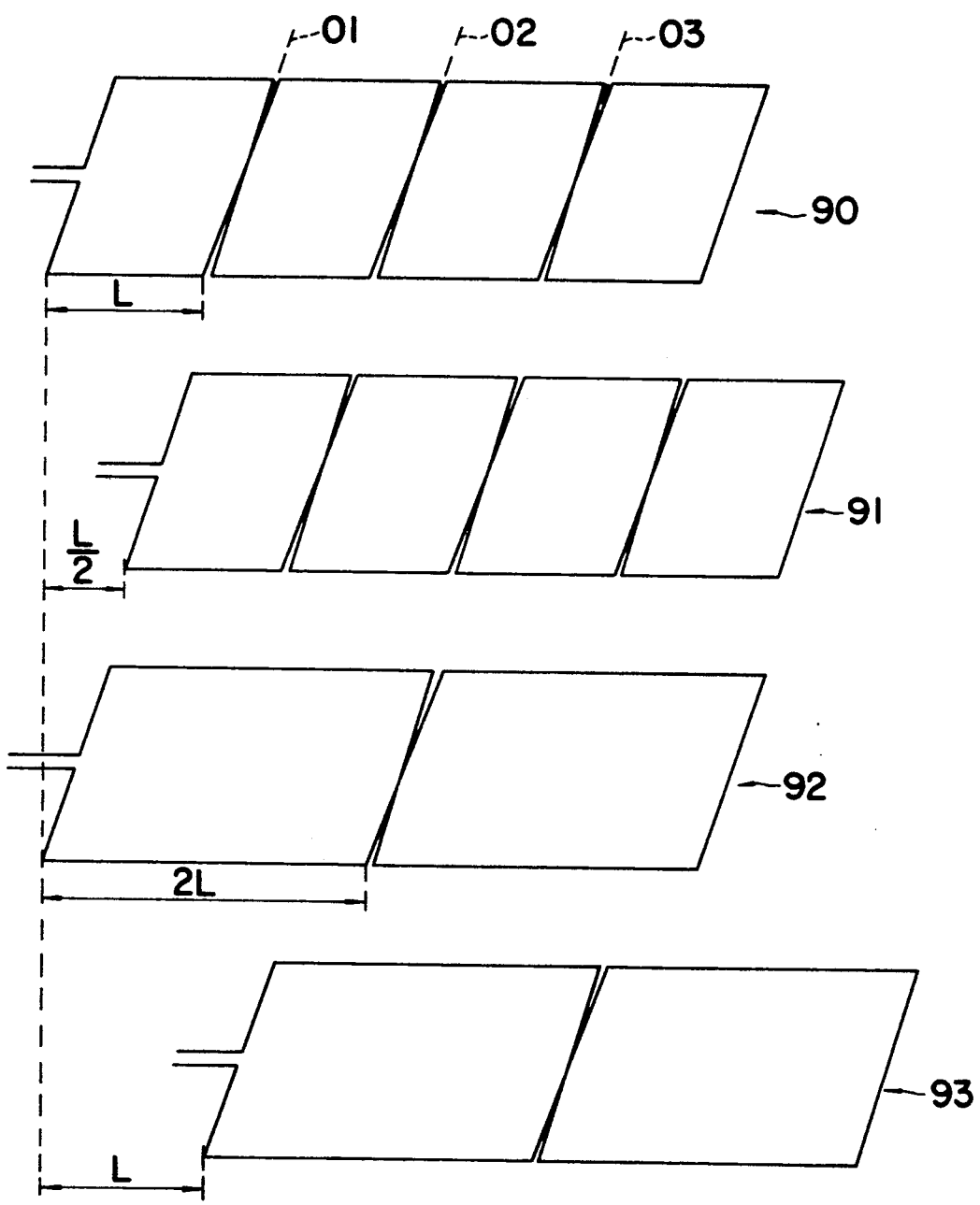

In order to realize a wide detection range while maintaining a high detection accuracy, a detection coil structured as shown in FIG. 12 may be used.

That is, in the first detection coil 90, four rectangular coils each having a side of length L are connected to one another so as to successively and alternately cancel the induced electromotive voltages.

The second detection coil 91 has the same shape as the first detection coil 90 but is displaced by a distance L/2 from the first detection coil 90.

As a result, an output signal the amplitude of which is changed in accordance with the position of the movable body with respect to junctions 01, 02 and 03 of the coils can be obtained.

Therefore, coordinate data can be detected in a wide range by arranging a structure in which detection coils 92 and 93 are combined with the detection coils 90 and 91, the detection coils 92 and 93 having an area twice that of the detection coils 90 and 91.

In the embodiments described above, the exciting coil is driven by a sine wave signal. The present invention is not limited to such a construction. A variety of drive signals such as a rectangular wave signal, a triangular signal or the like can be employed if desired.

In the embodiments described above, the resonance coils are triangularly or linearly arranged in the movable body. The present invention is not limited to such a construction. The resonance coils may, if desired, be arranged in the form of a rectangle, a pentagon, or the like.

In the embodiments described above, the resonance coils are identified by utilizing the difference in the resonance frequencies. The present invention is not limited to such a construction. In the case where resonance coils having the same resonance frequency are not simultaneously positioned on the tablet, the difference in the electric currents passing through the resonance coils may be detected so that the resonance coils are identified.

That is, since the electric currents passing through the resonance coils are different from one another, a subtraction signal $S_{XS}$ (compare FIG. 6) having different signal levels can be obtained when the exciting coil 24 is driven at the resonance frequency. Therefore, a further large number of movable bodies, their directions, and their sides can be identified by combining resonance coils having different resonance frequencies.

Figure 13:
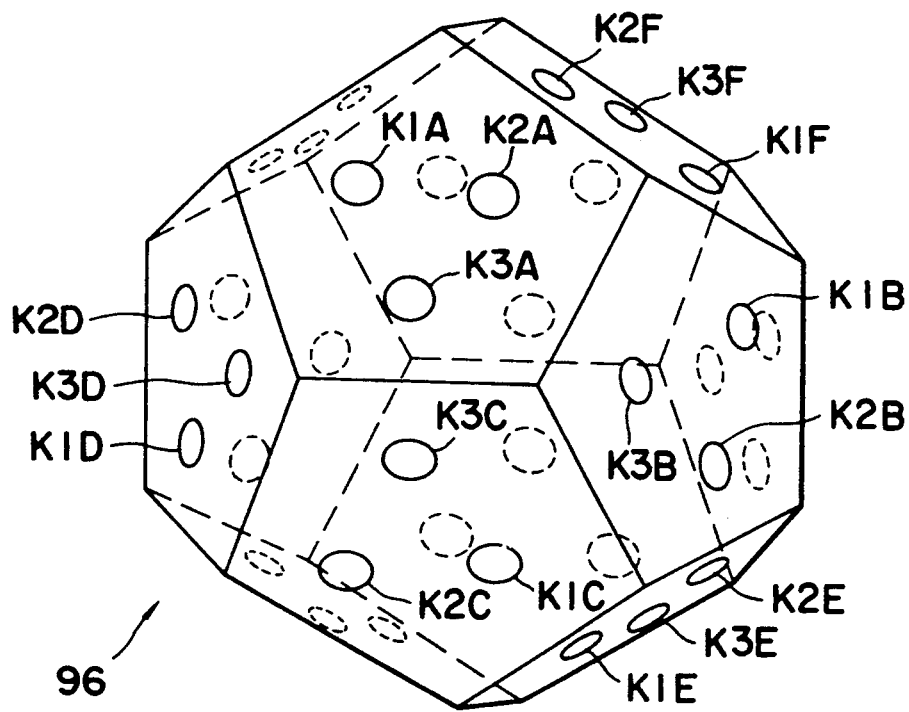
FIG. 13 is a schematic perspective view illustrating another embodiment of the movable body.

In the third embodiment, coordinate data is detected by identifying the side of the movable body. The present invention is not limited to such a construction. For example, a structure as shown in FIG. 13 may be employed in which a polyhedron 96 is used as the movable body and the side resting on or confronting the surface of the tablet is detected so as to provide coordinate input data.

That is, the resonance circuits K1A to K3A, K1B to K3B, ..., K1L to K3L are allotted to each of the sides of the polyhedron 96.

As a result, the side resting on or confronting the surface of the tablet, the direction and the coordinates can be supplied as input data in accordance with coordinate data of the resonance coils obtained by successively switching the drive frequency of the exciting coil 24.

In the embodiments described above, the frequency of the drive signal $S_D$ is switched in a stepped manner. The present invention is not limited to such a construction. For example, a structure may be employed in which the clock signal processing circuit is constituted by a frequency modulation circuit so as to continuously switch the frequency of the drive signal $S_D$.

As a result, a subtraction signal $S_X$ the signal level of which is rapidly changed in accordance with the sharpness Q of the resonance coil in the vicinity of the resonance frequency of the resonance coil can be obtained.

Therefore, a structure may be employed in which the change in the subtraction signal $S_X$ is detected so as to detect the sharpness Q so that the resonance coils are indirectly identified in accordance with the frequency of the drive signal $S_D$ and the output signals from the detection coils 26C, 27C, 28C and 29C, and position information of the movable bodies is provided as an input.

As a result, even if the comparison circuit 54 and the retriggerable monostable multivibrator circuit 62 are omitted, the resonance coils in which resistors having the same resonance frequency but having different resistance levels are connected can be identified. Therefore, the overall structure can be simplified.

In the embodiments described above, the delay circuit is constituted by longitudinally connecting the shift register circuits. The present invention is not limited to such a construction. The delay circuit may be constituted by memory circuits.

In the embodiments described above, the output signals $V_{X4}$ are delayed. The present invention is not limited to provide a construction. The output signals $V_{X3}$ and $V_{Y3}$ may be delayed instead.

In the embodiments described above, the output signal from the detection coil is processed after being converted into a digital signal. The present invention is not limited to such a construction. The output signal may be processed as an analog signal.

That is, the output signals $V_{X1}$, $V_{X2}$, $V_{Y1}$ and $V_{Y2}$ are amplified, and then the phase of the output signals $V_{X1}$ and $V_{Y1}$ or the phase of the output signals $V_{X2}$ and $V_{Y2}$ is delayed by 90° in the phase circuit.

Furthermore, the subtraction between the output signal from the phase circuit and the output signals $V_{X2}$ and $V_{Y2}$ or the output signals $V_{X1}$ and Y1 is carried out to produce a subtraction signal. Then the address data is latched when the thus processed subtraction signal rises above the zero level.

Moreover, another structure may be employed in which the level of the subtraction signal is compensated to a predetermined reference value, and its phase is compared with that of the drive signal of the exciting coil by using a phase comparator.

As a result, the output voltage of the phase comparator can be changed in accordance with the position of the movable body. Therefore, coordinate data of the movable body can be provided as an input.

In the embodiments described above, the address data is latched when the subtraction signal rises above the zero level. The present invention is not limited to such a construction. The address data may be latched at the last trailing timing from the zero level. A structure may be employed in which a compensation is made in such a manner that the amplitude of the subtraction signal assumes a predetermined value and then the address data is latched when it rises to a predetermined level or at the last trailing timing. Furthermore, the address data may be latched when the subtraction signal rises to a predetermined signal level that corresponds to the wave height of the subtraction signal or at the last trailing timing.

In the embodiments described above, a movable body having series resonance circuits in which resistances are connected is employed. The movable body is not limited to such a construction. The resistor may be omitted from the structure.

In the embodiments described above, two dimensional coordinate input data is provided. The present invention is not limited to such a construction. The present invention may be applied to a case in which one-dimensional coordinate input data is provided.

In the embodiments described above, handwritten characters are supplied as inputs. The present invention is not limited to such a construction. The present invention can be widely applied to cases in which a variety of coordinate input data is provided, such as a case in which a graphic is supplied as an input.

The present invention is not limited to the coordinate data input means. An operator can be identified by structure in which the resonance frequency of each of the resonance coils and their positional relationships are switched to identify movable bodies held by a plurality of operators. Therefore, in the present invention the movable body can serve a password function.

Furthermore, the present invention can be widely applied to a variety of input devices such as the input device of an electronic key by utilizing the above-described identification function.

In this case, the control circuit may transmit a signal for identifying the movable body in accordance with coordinate data of the resonance coil.

Many other modifications of the preferred embodiments of the invention described above will readily occur to those skilled in the art. Accordingly, the preceding description is merely illustrative, and the scope of the invention is defined only by the appended claims.

What is claimed is:

1. An input device comprising:
    an exciting coil for generating a predetermined exciting magnetic field;
    first and second rectangular coils having a side of length L and displaced from each other by a distance equal to L in a predetermined direction for generating an induced electromotive voltage when excited by said exciting coil; and
    third and fourth rectangular coils having a side of length L and displaced from each other by a distance equal to L in said predetermined direction for generating an induced electromotive voltage when excited by said exciting coil, said third and fourth coils being displaced from said first and second coils by a distance equal to L/2.

2. An input device according to claim 1 further comprising a body capable of movement adjacent to said coils so as to disturb said magnetic field in such a manner as to enable a determination to be made with respect to said movement.

3. An input device comprising:
   housing means;
   an exciting coil for generating a predetermined exciting magnetic field;
   first and second rectangular coils (26CL, 26CR) disposed on opposite sides of a first printed circuit board and displaced from each other by a predetermined distance in a predetermined direction for generating an induced electromotive voltage when excited by said exciting coil;
   third and fourth rectangular coils (27CL, 27CR) disposed on opposite sides of a second printed circuit board and displaced from each other by a predetermined distance in said predetermined direction for generating an induced electromotive voltage when excited by said exciting coil, said third and fourth coils being disposed at positions displaced by a predetermined distance from said first and second coils;
   fifth and sixth rectangular coils (28CL, 28CR) disposed on opposite sides of a third printed circuit board and displaced from each other by a predetermined distance in a direction perpendicular to said predetermined direction for generating an induced electromotive voltage when excited by said exciting coil; and
   seventh and eighth rectangular coils (29CL, 29CR) disposed on opposite sides of a fourth printed circuit board and displaced from each other by a predetermined distance in said direction perpendicular to said predetermined direction for generating an induced electromotive voltage when excited by said exciting coil, said seventh and eighth coils being disposed at positions displaced by a predetermined distance from said fifth and sixth coils;
   said first through fourth printed circuit boards being stacked in said housing means, thereby forming a unitary body.

4. An input device comprising:
   housing means;
   an exciting coil for generating a predetermined exciting magnetic field;
   first and second rectangular coils (26CL, 26CR) disposed on a first printed circuit board and displaced from each other by a predetermined distance in a predetermined direction for generating an induced electromotive voltage when excited by said exciting coil;
   third and fourth rectangular coils (27CL, 27CR) disposed on a second printed circuit board and displaced from each other by a predetermined distance in said predetermined direction for generating an induced electromotive voltage when excited by said exciting coil, said third and fourth coils being disposed at positions displaced by a predetermined distance from said first and second coils;
   fifth and sixth rectangular coils (28CL, 28CR) disposed on a third printed circuit board and displaced from each other by a predetermined distance in a direction perpendicular to said predetermined direction for generating an induced electromotive voltage when excited by said exciting coil; and
   seventh and eighth rectangular coils (29CL, 29CR) disposed on a fourth printed circuit board and displaced from each other by a predetermined distance in said direction perpendicular to said predetermined direction for generating an induced electromotive voltage when excited by said exciting coil, said seventh and eighth coils being disposed at positions displaced by a predetermined distance from said fifth and sixth coils;
   said first through fourth printed circuit boards being stacked in said housing means, thereby forming a unitary body;
   wherein said first through eighth coils are rectangular, predetermined sides of each of said first and second coils overlap each other, predetermined sides of each of said third and fourth coils overlap each other, predetermined sides of each of said fifth and sixth coils overlap each other and predetermined sides of each of said seventh and eight coils overlap each other and said overlapped sides are connected in such a manner that, in the absence of a disturbance of said magnetic field, said induced electromotive voltages cancel one another.

5. An input device according to claim 3 further comprising a body capable of movement adjacent to said coils so as to disturb said magnetic field in such a manner as to enable a determination to be made with respect to said movement.

6. An input device comprising:
   an exciting coil for generating a predetermined exciting magnetic field;
   first and second rectangular coils displaced from each other by a predetermined distance in a predetermined direction and capable of generating an induced electromotive voltage when excited by said exciting coil;
   third and fourth rectangular coils displaced from each other by a predetermined distance in said predetermined direction and capable of generating an induced electromotive voltage when excited by said exciting coil, said third and fourth coils being displaced by a predetermined distance from said first and second coils;
   drive signal generating circuit means for supplying a drive signal to said exciting coil; and
   drive signal switch circuit means for switching said drive signal to different frequencies; wherein
   coordinate data of movable bodies placed on said first through fourth coils is detected in accordance with a differential induced electromotive voltage between said first and second coils and a differential induced electromotive voltage between said third and fourth coils and said movable bodies are identified in accordance with the frequencies of said drive signal.

7. An input device according to claim 6 wherein said movable bodies comprise resonance circuits respectively including capacitors connected to said coils, said resonance circuits respectively resonating at the different frequencies of said drive signal.

8. An input device comprising:
   an exciting coil for generating a predetermined exciting magnetic field;
   first and second rectangular coils displaced from each other by a predetermined distance in a predetermined direction and capable of generating an induced electromotive voltage when excited by said exciting coil;

third and fourth rectangular coils displaced from each other by a predetermined distance in said predetermined direction and capable of generating an induced electromotive voltage when excited by said exciting coil, said third and fourth coils being displaced by a predetermined distance from said first and second coils;

delay circuit means for generating a delay signal corresponding to a differential induced electromotive voltage between said first and second coils or a differential induced electromotive voltage between said third and fourth coils; and subtraction circuit means for generating subtraction signals corresponding to a subtraction from the delay signal of the differential induced electromotive voltage between said third and fourth coils or the differential induced electromotive voltage between said first and second coils;

drive signal generating circuit means for supplying a drive signal to said exciting coil; and phase detecting circuit means for detecting the phase of the subtraction signals with reference to the phase of the drive signal.

9. An input device according to claim 8 further comprising a body capable of movement adjacent to said coils so as to disturb said magnetic field in such a manner as to induce said differential induced electromotive voltage between said first and second coils or said differential induced electromotive voltage between said third and fourth coils.

10. An input device according to claim 8 wherein said drive signal generating circuit means comprises address data generating circuit means for generating address data that is successively and circularly changed;

memory circuit means for generating successive digital waveform data corresponding to the address data;

digital-to-analog conversion circuit means responsive to the memory circuit means for converting said digital waveform data to analog data, said analog data being supplied for forming a drive signal for said exciting coil;

said phase detecting circuit means detecting the address data when the subtraction signals rise to a predetermined signal level or when the subtraction signals decline to the predetermined signal level so as to detect the phase of the subtraction signals with reference to the phase of the drive signal.

11. An input device comprising:

an exciting coil for generating a predetermined exciting magnetic field;

first and second rectangular coils displaced from each other by a predetermined distance in a predetermined direction and capable of generating an induced electromotive voltage when excited by said exciting coil;

third and fourth rectangular coils displaced from each other by a predetermined distance in said predetermined direction and capable of generating an induced electromotive voltage when excited by said exciting coil, said third and fourth coils being displaced by a predetermined distance said first and second coils;

delay circuit means for generating a delay signal corresponding to a differential induced electromotive voltage between said first and second coils or a differential induced electromotive voltage between said third and fourth coils;

address data generating circuit means for generating address data that is successively and circularly changed;

memory circuit means for generating successive digital waveform data corresponding to the address data;

digital-to-analog conversion circuit means responsive to the memory circuit means for converting said digital waveform data to analog data, said analog data being supplied for forming a drive signal for said exciting coil; and latch circuit means for latching the address data when the differential induced electromotive voltage between said third and fourth coils or the differential induced electromotive voltage between said first and second coils rises to the level of the delay signal or when the differential induced electromotive voltage between said third and fourth coils or the differential induced electromotive between said first and second coils declines to the level of the delay signal.

12. An input device according to claim 11 further comprising a body capable of movement adjacent to said coils so as to disturb said magnetic field in such a manner as to induce said differential induced electromotive voltage between said first and second coils or said differential induced electromotive voltage between said third and fourth coils.

13. An input device comprising:

an exciting coil for generating a predetermined exciting magnetic field;

first and second rectangular coils displaced from each other by a predetermined distance in a predetermined direction and capable of generating an induced electromotive voltage when excited by said exciting coil;

third and fourth rectangular coils displaced from each other by a predetermined distance in said predetermined direction and capable of generating an induced electromotive voltage when excited by said exciting coil, said third and fourth coils being displaced by a predetermined distance from said first and second coils;

drive signal generating circuit means for supplying a drive signal to said exciting coil; and drive signal switch circuit means for switching said drive signal to different frequencies; wherein said frequencies of said drive signal are successively switched to detect coordinate data of objects placed on said first and second coils and said third and fourth coils and which disturb said exciting magnetic field in accordance with a differential induced electromotive voltage between said first and second coils and a differential induced electromotive voltage between said third and fourth coils, and, in accordance with said switched frequencies of said drive signal, coordinate data of said movable bodies or an identification of said movable bodies, or the orientation or side of said movable bodies confronting said first and second coils and said third and fourth coils is detected and provided as input data.

14. An input device according to claim 13 wherein said movable bodies comprises a plurality of resonance circuits constituted by connecting capacitors and said coils which are excited by said exciting magnetic field and which resonate at said switched frequencies of said drive signal.

* * * * *